(12) United States Patent
Gentry

(10) Patent No.: US 7,490,420 B2
(45) Date of Patent: Feb. 17, 2009

(54) BRUSH CLEARING SHEAR FOR FOUR WHEEL ALL TERRAIN VEHICLE

(76) Inventor: Anthony G. Gentry, 148 Cecil Prewitt Rd., Hornbeck, LA (US) 71439

( * ) Notice: Subject to any disclaimer, the term of this patent is extended or adjusted under 35 U.S.C. 154(b) by 0 days.

(21) Appl. No.: 11/131,667

(22) Filed: May 17, 2005

(65) Prior Publication Data

US 2006/0272310 A1    Dec. 7, 2006

(51) Int. Cl.
*A01G 23/06* (2006.01)
(52) U.S. Cl. .................................. 37/301; 144/34.6
(58) Field of Classification Search .............. 56/229; 37/301, 379, 468; 144/34.6; 172/272, 810, 172/817, 832
See application file for complete search history.

(56) References Cited

U.S. PATENT DOCUMENTS

| | | | | |
|---|---|---|---|---|
| 2,061,585 A | * | 11/1936 | Meyer | 37/233 |
| 2,650,628 A | * | 9/1953 | Long | 144/34.1 |
| 3,243,903 A | * | 4/1966 | Emory | 37/301 |
| 3,243,904 A | * | 4/1966 | Perry | 37/403 |
| 4,076,264 A | * | 2/1978 | Chatterley | 280/81.6 |
| 4,426,097 A | * | 1/1984 | Livingston | 280/416.1 |
| 4,512,593 A | * | 4/1985 | Ehrhardt | 280/460.1 |
| 6,036,417 A | * | 3/2000 | Weaver | 410/7 |
| 6,439,279 B1 | * | 8/2002 | Underwood | 144/34.6 |
| 6,925,735 B2 | * | 8/2005 | Hamm et al. | 37/231 |

* cited by examiner

*Primary Examiner*—Thomas B Will
*Assistant Examiner*—Mai T Nguyen
(74) *Attorney, Agent, or Firm*—Rodney B. Jordan

(57) ABSTRACT

An apparatus for clearing brush for a four-wheel all terrain vehicle path, the apparatus to be attached to the front of and propelled by a four-wheel all terrain vehicle commonly referred to as a four-wheeler the apparatus comprising a set of blades on a V shaped self-supporting, wheel-mounted chassis.

1 Claim, 8 Drawing Sheets

BRUSH CLEARING SHEAR FOR FOUR WHEEL ALL TERRAIN VEHICLE

BACKGROUND OF THE INVENTION

There are many situations in which access to remote areas in the forest is necessary. As timber increases in value its proper management becomes more critical. This management requires on-site observation from timber owners and timberland management experts. Conservation efforts also often require on-site inspection at regular intervals. Likewise, the sport of hunting necessitates easy access to prime hunting areas and hunting stands often located deep in the forest or in areas heavily covered with brush. Forests, by their very nature, are often laden with dense undergrowth consisting of briars, small trees and other growth yearning for a nitch of existence and a glimpse of sunlight needed for survival. This growth often makes it very difficult for individuals to reach their desired locations in the forest. The answer to the problem is and has always been trails leading to the desired locations. In today's world those trails must accommodate motorized vehicles. The choice of motorized vehicle for mobility in the forest is more often than not the four wheel all terrain vehicles. It therefore becomes necessary for a means of quickly and efficiently clearing trails that will accommodate these vehicles. The present invention puts forth an apparatus for accomplishing this task that is attached to and used in conjunction with the very vehicles that will follow the paths created. The present invention comprises a four-wheeler type all terrain vehicles mounted sheer for clearing brush at a width that will accommodate the four-wheeler's use.

DESCRIPTION OF THE PRIOR ART

Brush sheers are currently in use with large clearing and dozing machines. These sheers are used primarily for the clearing of land. To attempt their use in clearing four wheeler paths would prove impractical. Erosion, destruction of valuable timber, lack of maneuverability and general degradation of the natural landscape are just a few of the problems that would arise with their use. The present invention accomplishes the task as hand efficiently, quickly, practically and without any of the complications as listed above.

DETAILED DESCRIPTION

Figure 1:
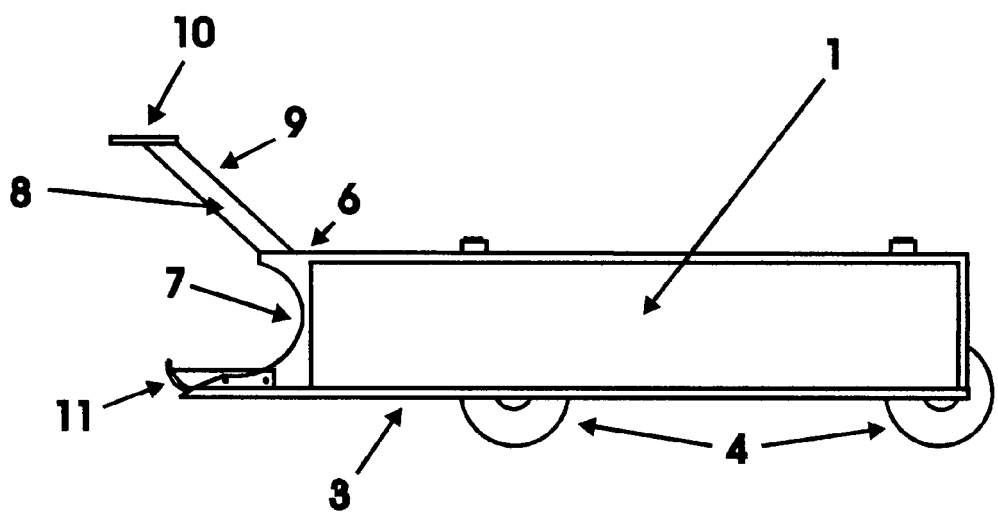
FIG. 1 is a side elevation view of the brush clearing sheer.

Referring to the drawings it can be seen that two elongated, rectangular plates 1 are joined together at one end and separated at the other so as to form a wedge shaped chassis for the brush clearing sheer. The wedge shape is reinforced by three braces 2 running from one plate to another at specific places between the forward point and the rear of the wedge. It can also be seen that each wedge is provided with a blade 3 projecting outward from and running along the outer, lower edges of the rectangular plates 1. These blades 3 sheer of brush and small trees at the desired height above the ground as the wedge shaped chassis is forced over brushy terrain by the four-wheeler. It can also be seen that casters 4 are affixed to the forward and rear braces so as to hold the chassis, and thus the blades 3, at the optimum distance above the ground. The weight of the brush sheer is supported by these casters 4 so that the blades 3 will generally follow the shape of the terrain being cleared. A kicker blade 5 is affixed to the rear of each rectangular plate 1 so that the blades 3 lead to the kicker blades 5. These kicker blades 5 jut abruptly out from the general line of the main blades 3 so that a concentrated force is applied by their cutting edges to brush and trees whose resilience has overcome the cutting action of the main blades. The two rectangular plates 1 also serve as deflector walls directing severed brush, fallen logs, boulders and other debris away from the path of the oncoming four wheeler thus leaving a cleared path sufficient in width for the four wheeler to travel at other times.

Further review of figures one and two reveals that a vertical, rectangular cutting plate 6 is affixed to the forward point of the wedge shaped chassis. The forward vertical side 7 of this cutting plate 6 comprises a concave curved shape with a sharpened edge. This sharpened edge contains and cuts brush, vines and other debris that lies vertically in the path of the brush cutter. It can also be seen that a tree and vine catcher 8 extends at an angle upward and forward from the top of the cutting plate 6. This tree and vine catcher 8 comprises a rigid shaft 9 projecting forward topped by a horizontally position "U" or "V" shaped fork 10. The fork can be used to push down small trees as the rigid shaft 9 directs horizontally positioned brush and debris into the sharpened edge of the cutting plate 6.

Figures one and two also reveal that a nose guard device 11 comprising an upturned skid plate is attached to and projecting forward from the lower edge of the cutting plate 6. This nose guard device raises the front of the chassis whenever the terrain is very uneven or a mound is encountered, preventing the cutting plate 6 from digging into the ground.

Figure 2:
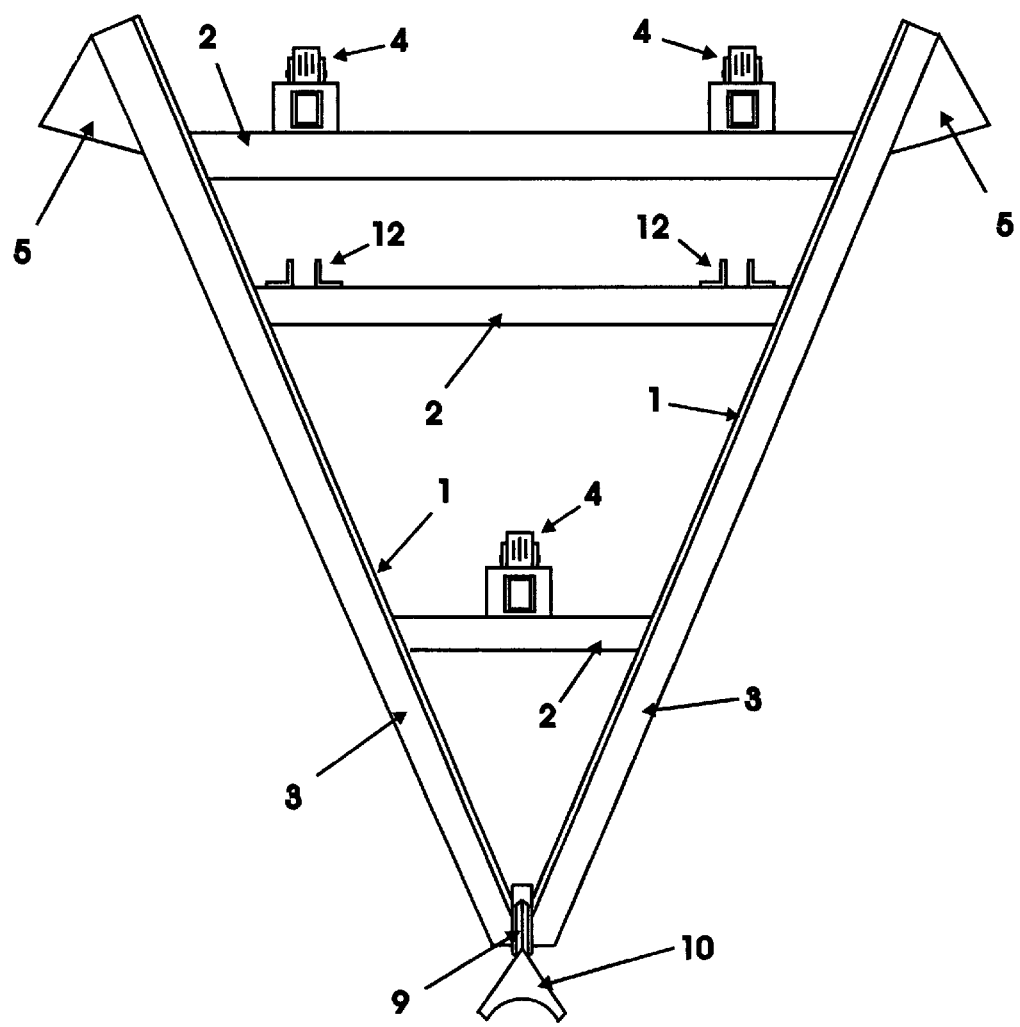
FIG. 2 is a top elevation view of the brush clearing sheer.
Figure 3:
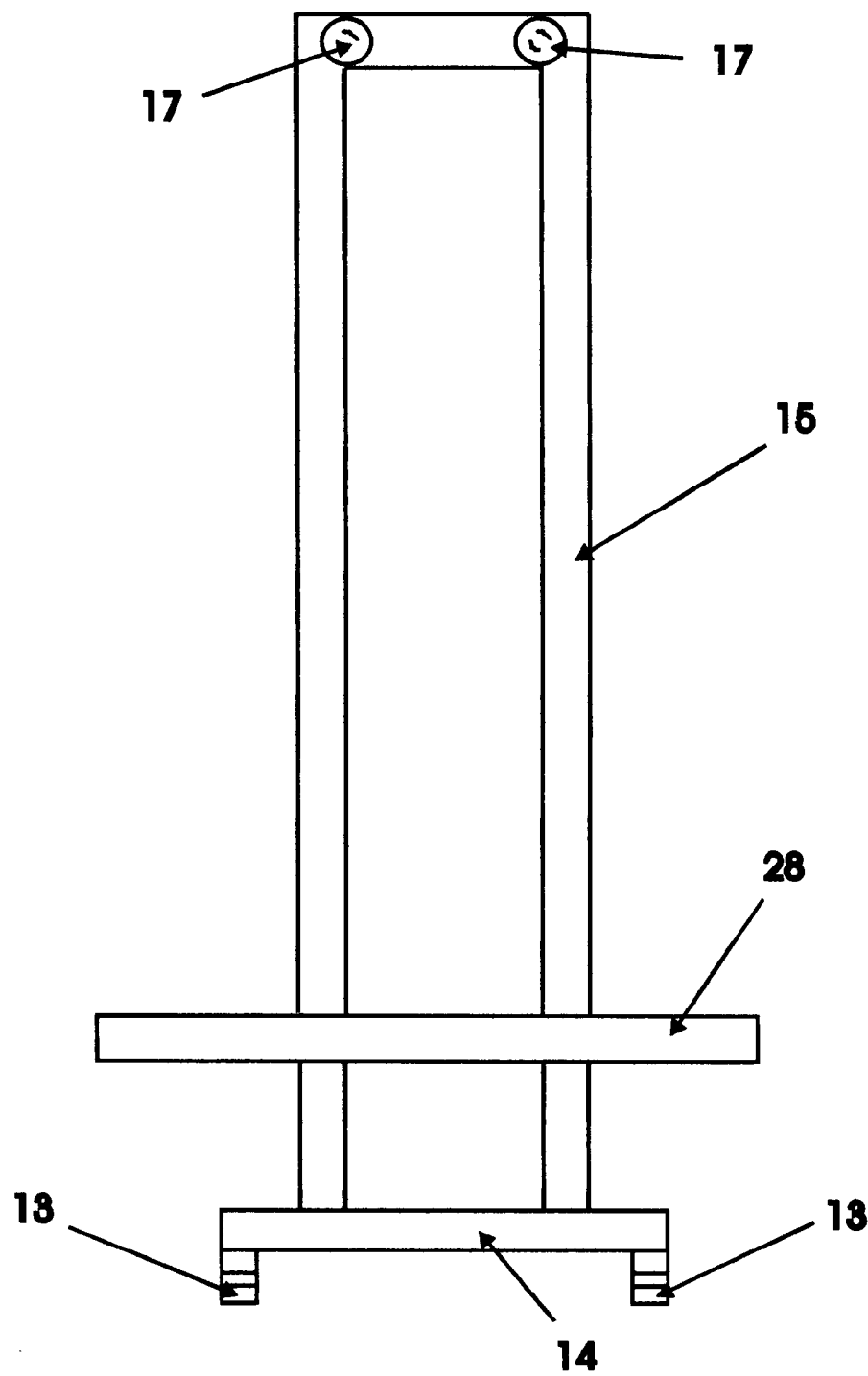
FIG. 3 is a top elevation view of the connecter bar assembly.
Figure 4:
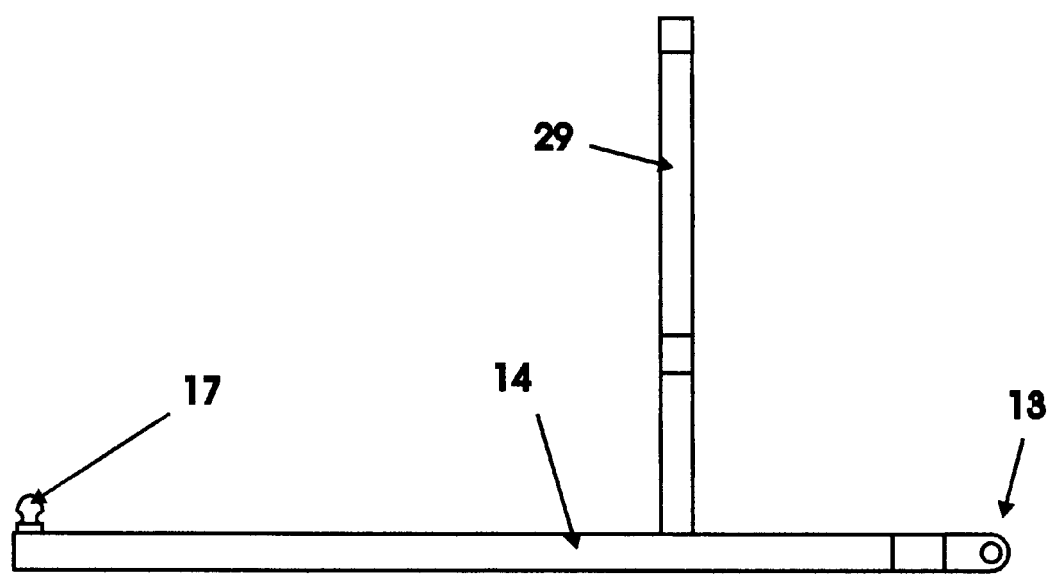
FIG. 4 is a side elevation view of the connecter bar assembly.
Figure 5:
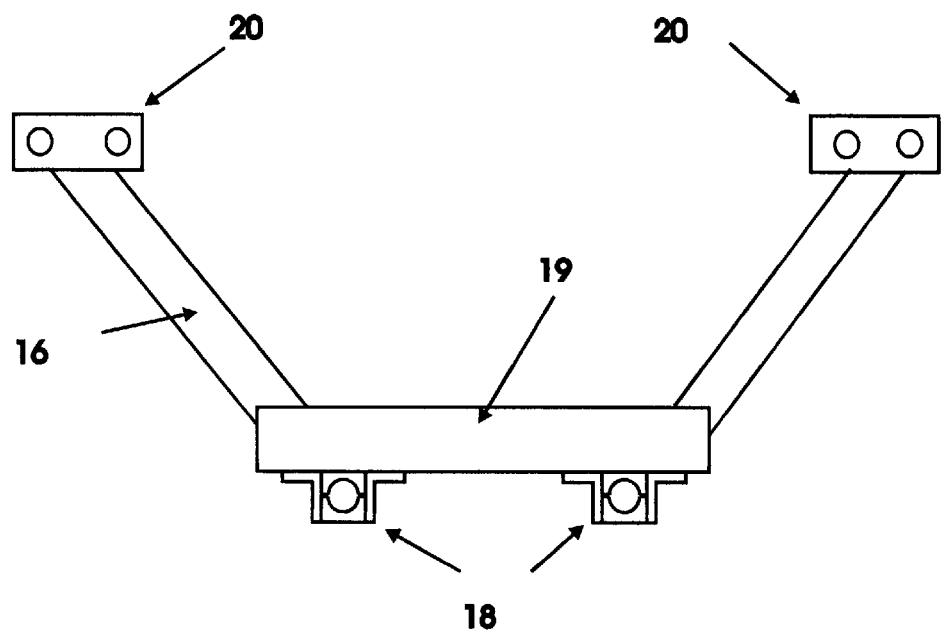
FIG. 5 is a top elevation view of the connecter bar assembly quick disconnect apparatus.
Figure 6:
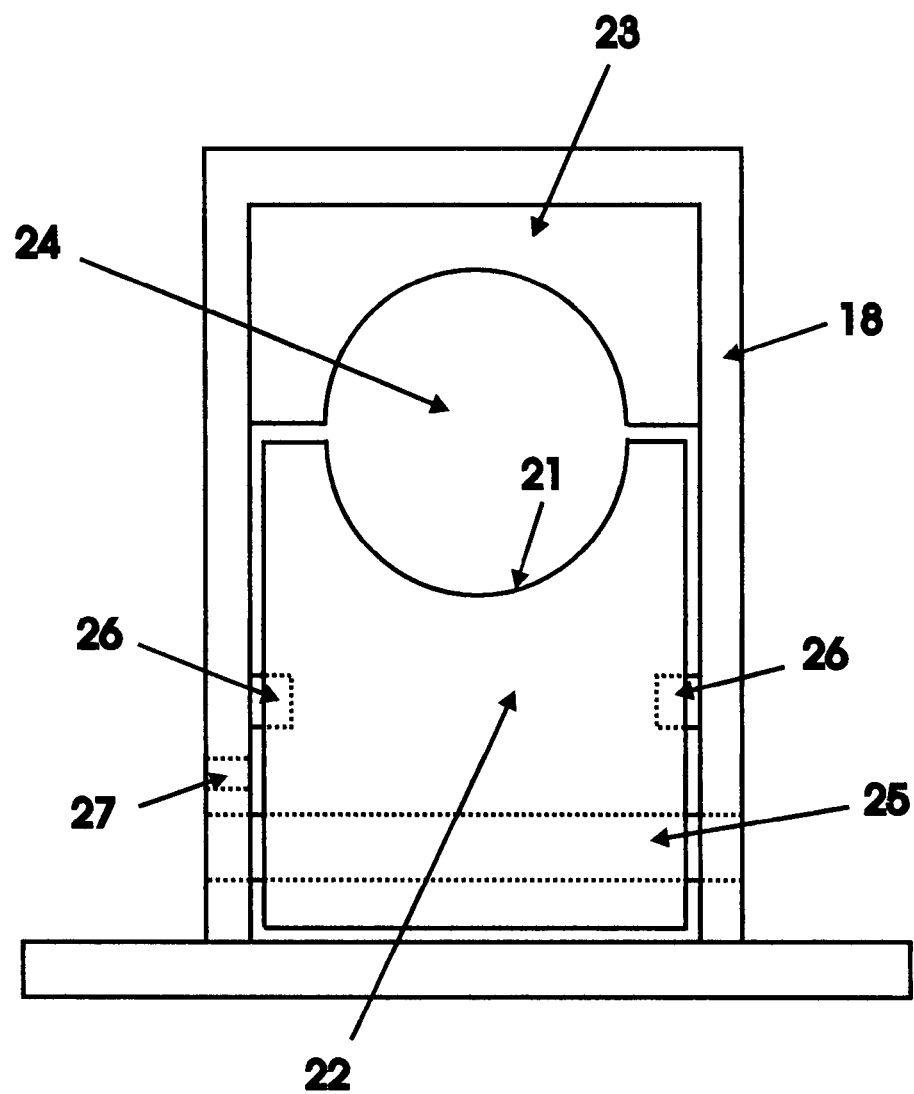
FIG. 6 is a top elevation view of the quick disconnect apparatus flap retainer mechanism.
Figure 7:
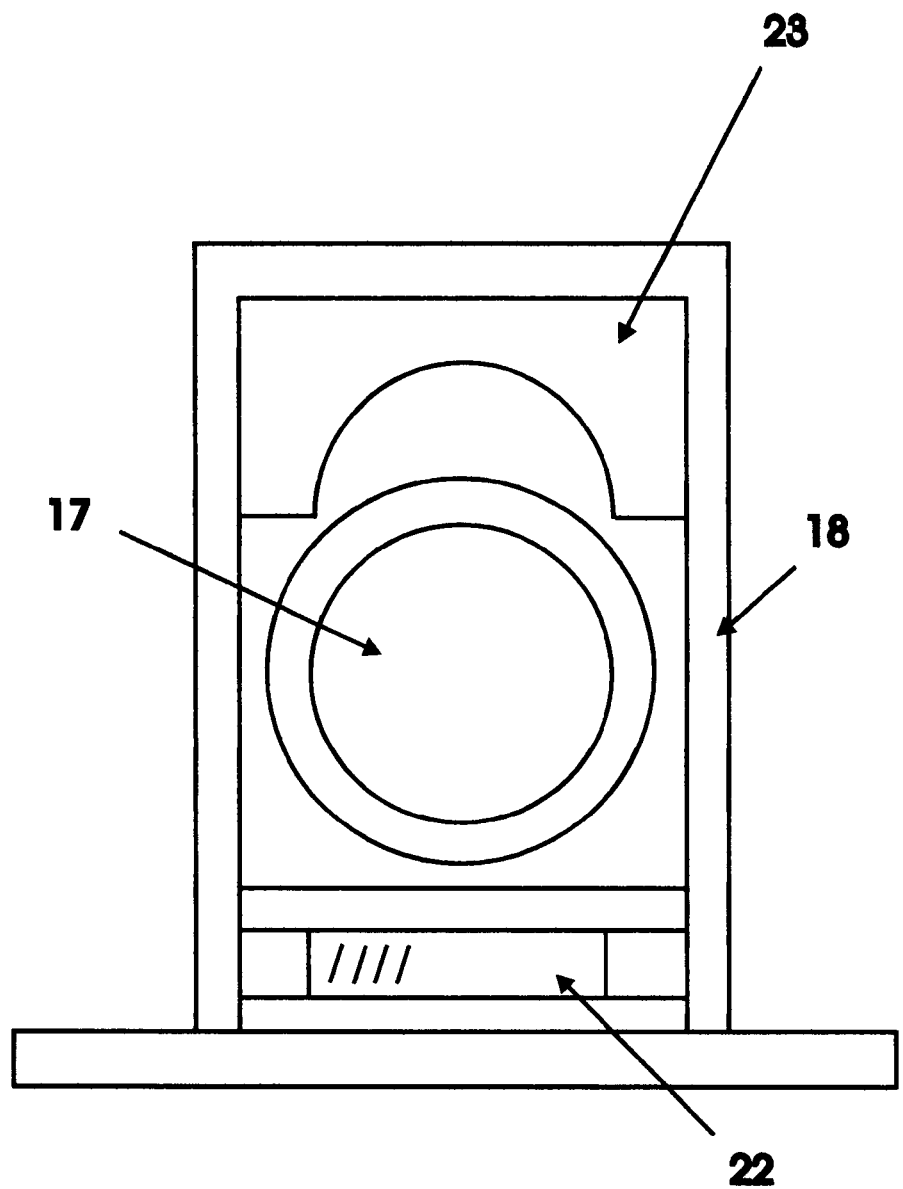
FIG. 7 is a top elevation view of the quick disconnect apparatus frap retainer mechanism showing the catch knob entry.
Figure 8:
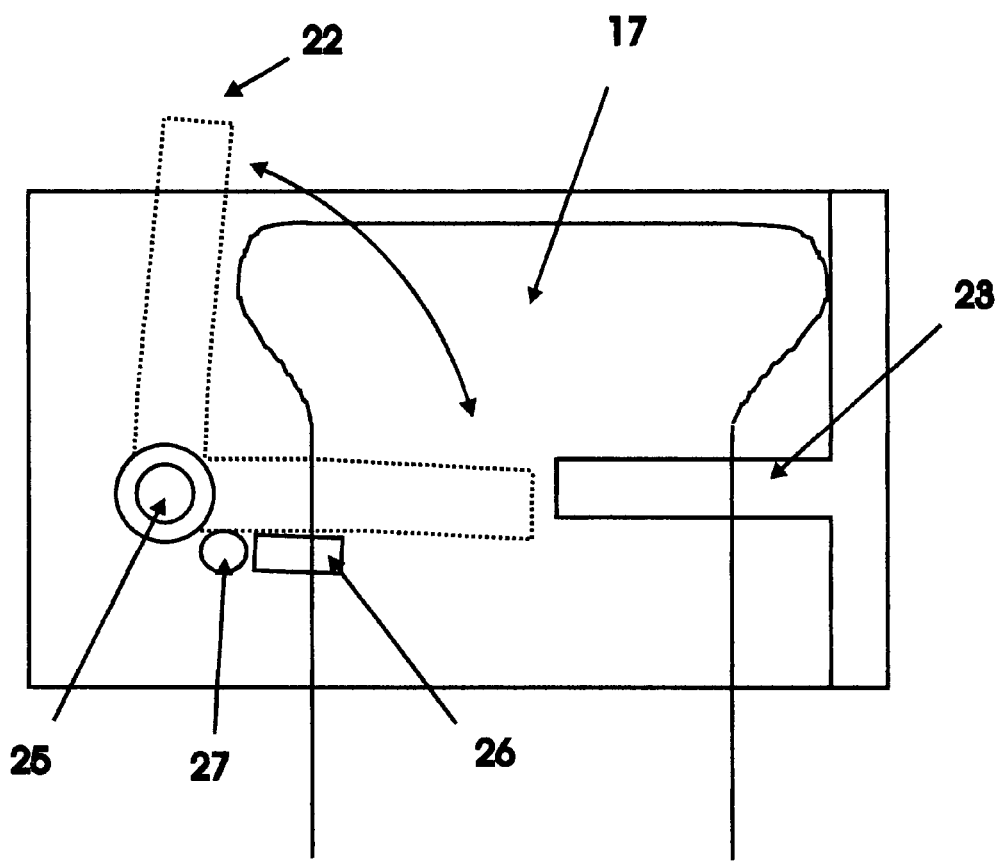
FIG. 8 is a side elevation view of the quick disconnect apparatus frap retainer mechanism showing the catch knob in place for use.

Referring specifically to FIG. 2 one can see that two brackets 12 are affixed to the brace 2 located near the center of the chassis. The forward ends 13 of the connector bar assembly 14 featured in FIGS. 3 and 4 are attached to the brackets 12, which are affixed to the central brace. The rearward ends 15 of the connector bar assembly 14 are attached to the rear chassis of a four-wheeler by way of the connecter bar quick disconnect apparatus 16 featured in figure five. Each rearward end 15 of the connecter bar assembly 14 is equipped with a dreadlock ball 17. These dreadlock balls 17 are the means by which the rearward ends 15 of the connector bar assembly 14 are affixed to the connecter bar quick disconnect apparatus 16. Figures six, seven and eight detail the two dreadlock ball receptacle apparatus 18 which are mounted to the cross bar 19 of the connecter bar quick disconnect apparatus 16. The connecter bar quick disconnect apparatus 16 is bolted permanently to the four-wheeler chassis by bolt plates 20.

Figures six, seven and eight detail that the forward curved edge 21 of the retainer flap 22 and the curve of the rear side of the dreadlock connecter plate 23 form a circular aperture retainer hole 24. The retainer flap 22 is pushed upward as the dreadlock ball 17 is pushed up toward it allowing the dreadlock ball 17 to pass through the retainer hole 24. The retainer hole 24 is just smaller in diameter than the dreadlock ball 17. As retainer flap 22 falls into place the dreadlock ball 17 is trapped within the retainer hole 24. The dreadlock ball 17 may pivot but will stay within the connected until the retainer flap 22 is pushed upward. The retainer flap 22 is hinged by the flap hinge pin 25 and rests upon the flap bar supports 26 when in use. The retainer flap 22 may be raised, thus releasing the dreadlock balls 17 by inserting a key in the keyhole 27 on the side of the dreadlock ball receptacle apparatus 18.

Further review of figures three and four reveal that a removable brush guard 28 is attached atop the connecter bar assembly 14 just forward of the four-wheeler. This brush guard 28 protects the four-wheeler and the operator from accumulated brush and falling trees as the brush sheer is being used.

I claim:

1. A brush and tree clearing device comprising a v shaped chassis to be attached to the front of and powered by a four wheeler all terrain vehicle, said device having a means for attaching said device to said four wheeler comprises a connector bar assembly and a quick disconnect apparatus, said connector bar assembly further comprising two connector bars, said bars being joined on either end by cross members, said bars being positioned parallel to one another so as to form a rectangular connector frame, said connector frame having a forward and a rearward end, said forward end being pivotally attached to said v shaped chassis, said rearward end being pivotallly connected to said Four-wheeler by said quick disconnect apparatus, said quick disconnect apparatus further comprises two mounting balls, said balls being affixed to said rearward end of said connector frame, a mounting bracket and two connector ball receptacles suitably affixed to said four-wheeler by way of said mounting bracket frame, wherein said connector ball receptacles each further comprise a circular collar, said collars lying in a horizontal plane, said collars being slightly smaller than said connector balls, said collars being divided into a fixed half and hinged half, said hinged half being allowed to swing upward when met by said connector balls thus allowing said connector balls to enter said collar, said hinged half being able to fall into a position so as to lock said connector balls into said collars.

* * * * *